United States Patent
Hirschmann et al.

(10) Patent No.: US 6,403,171 B1
(45) Date of Patent: *Jun. 11, 2002

(54) TN AND HTN LIQUID-CRYSTAL DISPLAY

(75) Inventors: Harald Hirschmann; Marcus Reuter, both of Darmstadt (DE)

(73) Assignee: Merck GmbH, Darmstadt (DE)

(*) Notice: This patent issued on a continued prosecution application filed under 37 CFR 1.53(d), and is subject to the twenty year patent term provisions of 35 U.S.C. 154(a)(2).

Subject to any disclaimer, the term of this patent is extended or adjusted under 35 U.S.C. 154(b) by 0 days.

(21) Appl. No.: 09/450,335

(22) Filed: Nov. 29, 1999

(30) Foreign Application Priority Data

Nov. 28, 1998 (DE) .................................. 198 55 071

(51) Int. Cl.⁷ .................. C09K 19/30; C09K 19/20; C09K 19/12; C09K 19/34; C09K 19/42
(52) U.S. Cl. .............. 428/1.1; 252/299.61; 252/299.63; 252/299.66; 252/299.67
(58) Field of Search ................ 252/299.63, 299.66, 252/299.67, 299.61; 428/1.1

(56) References Cited

U.S. PATENT DOCUMENTS

| | | | | |
|---|---|---|---|---|
| 5,618,466 A | * | 4/1997 | Tomi et al. | 252/299.63 |
| 5,653,912 A | * | 8/1997 | Nakagawa et al. | 252/299.01 |
| 5,965,060 A | * | 10/1999 | Tarumi et al. | 252/299.63 |
| 5,976,404 A | * | 11/1999 | Hirschmann et al. | 252/299.01 |
| 5,993,691 A | * | 11/1999 | Pausch et al. | 252/299.63 |
| 6,027,665 A | * | 2/2000 | Pausch et al. | 252/299.61 |
| 6,028,655 A | * | 2/2000 | Weber et al. | 349/182 |
| 6,056,894 A | * | 5/2000 | Hirschamnn et al. | 252/299.63 |

* cited by examiner

*Primary Examiner*—Shean C. Wu
(74) *Attorney, Agent, or Firm*—Millen, White, Zelano & Branigan, P.C.

(57) ABSTRACT

TN and HTN liquid-crystal displays having very short response times and good steepness values and angle dependencies, are obtained using nematic liquid-crystal mixtures which comprise compounds of formula IA in combination with compounds of the formula IC:

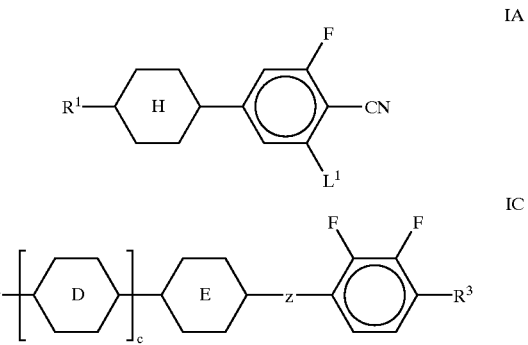

in which $R^1$ to $R^3$, $L^1$, $Z$,

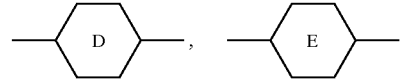

and C are defined herein.

16 Claims, No Drawings

TN AND HTN LIQUID-CRYSTAL DISPLAY

The invention relates to TN (twisted nematic) and HTN (high performance twisted nematic) liquid-crystal displays having very short response times and good steepness values and angle dependencies, and to the nematic liquid-crystal mixtures used therein.

TN displays in accordance with the preamble are known, for example from M. Schadt and W. Helfrich, Appl. Phys. Lett., 18, 127 (1971). Owing to the limited steepness of their electro-optical characteristic line, TN displays are usually operated at low multiplex rates of, for example, from 1:2 to 1:4. For higher multiplex rates of, for example, 1:16 or more, STN (supertwisted nematic) displays are usually used; these have greater steepness values, but are more expensive and of more complex construction compared with TN displays.

A display type that has been developed recently is the so-called HTN display. This has a higher twisting angle, typically in the range from about 100 to 120°, compared with conventional TN displays. HTN displays allow better electro-optical properties to be achieved, such as, for example, a lower threshold voltage with lower temperature dependence, lower viewing-angle dependence of the contrast and in particular higher steepness values and thus higher multiplex rates, than in conventional TN displays for approximately the same costs. Compared with STN displays, HTN displays have the advantage of a simpler construction. They are therefore particularly suitable for applications in the region of low and moderate multiplex rates, such as, for example, 1:4, 1:8 or 1:16.

In order to achieve a steep electro-optical characteristic line in the liquid-crystal displays according to the invention, the liquid-crystal mixtures should have relatively small values for $K_{33}/K_{11}$ and relatively small values for $\Delta\epsilon/\epsilon_\perp$.

In addition to optimization of the contrast and response times, other important requirements are made of such mixtures:

1. Broad d/p window
2. High long-term chemical stability
3. High electrical resistance
4. Low frequency dependence of the threshold voltage.

The parameter combinations achieved are nowhere near sufficient, in particular for highly twisted displays (HTN). This is in part attributable to the fact that the various requirements are influenced in opposite directions by material parameters.

There thus continues to be a great demand for TN and HTN liquid-crystal displays having a large working-temperature range, high characteristic-line steepness, good angle dependence of the contrast, low threshold voltage and high low-temperature stability which satisfy the abovementioned requirements.

The invention has the object of providing liquid-crystal displays which do not have the abovementioned disadvantages, or only do so to a lesser extent, and at the same time have short response times and very good steepness values.

Upon further study of the specification and appended claims, further objects and advantages of this invention will become apparent to those skilled in the art.

It has now been found that these objects can be achieved if use. is made of nematic liquid-crystal mixtures which comprise compounds of the formula IA in combination with compounds of the formula IC:

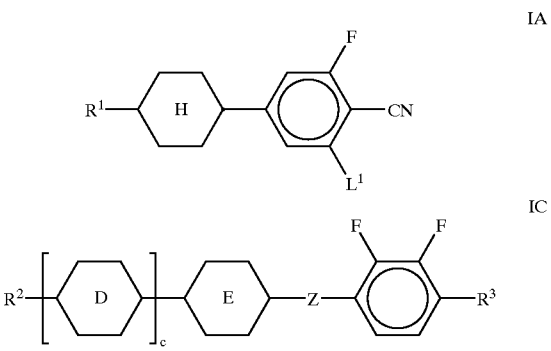

in which $R^1$ to $R^3$ are each, independently of one another, an alkyl group having 1 to 12 carbon atoms, in which, in addition, one or two non-adjacent $CH_2$ groups may be replaced by —O—, —CH=CH—, —CO—, —OCO— or —COO—, $L^1$ is H or F, z is —COO—, —CH$_2$CH$_2$— or a single bond,

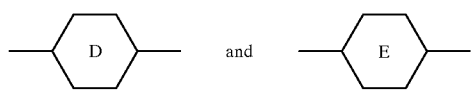

are each, independently of one another,

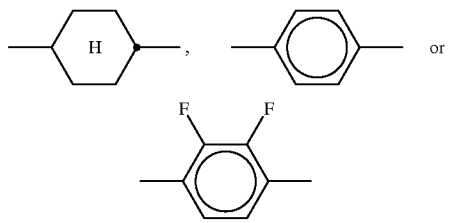

and c is 0 or 1.

The liquid-crystal media according to the invention have a low viscosity with low temperature dependence, long storage times in the display at low temperatures and low S-N transitions.

In particular, the combination of the compounds of the formulae IA and IC effect a significant reduction in the threshold voltage in TN and HTN displays at the same time as increasing the steepness and increasing the low-temperature stability.

The invention thus relates to a liquid-crystal display having two outer plates which, with a frame, form a cell, a nematic liquid-crystal mixture of positive dielectric anisotropy in the cell, electrode layers with alignment layers on the insides of the outer plates, a tilt angle between the longitudinal axis of the molecules at the surface of the outer plates and the outer plates of from 0 degrees to 15 degrees, and a twist angle of the liquid-crystal mixture in the cell from alignment layer to alignment layer with a value of between 22.5° and 160°, a nematic liquid-crystal mixture containing:
a) 10–80% by weight of a liquid-crystalline Component A consisting of one or more compounds having a dielectric anisotropy of greater than +1.5;
b) 15–70% by weight of a liquid-crystalline Component B consisting of one or more compounds having a dielectric anisotropy of between −1.5 and +1.5;
c) 2–50% by weight of a liquid-crystalline Component C consisting of one or more compounds having a dielectric anisotropy of below −1.5, and
d) if desired, an optically active Component D in such an amount that the ratio between the layer thickness (separation of the outer plates) and the natural pitch of the chiral nematic liquid-crystal mixture is from about 0.2 to 1.3, characterized in that Component A comprises at least one compound of the formula IA

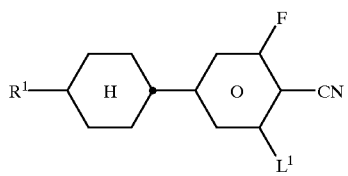

IA and Component C comprises at least one compound of the formula IC

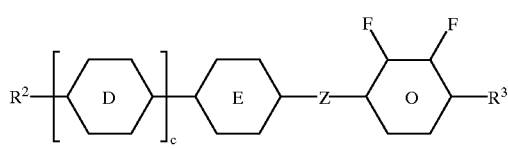

IC in which
$R^1$ to $R^3$ are each, independently of one another, an alkyl group having 1 to 12 carbon atoms, in which, in addition, one or two non-adjacent $CH_2$ groups may be replaced by —CO—, —CH=CH—, —CO—, —OCO— or —COO—,
$L^1$ is H or F,
Z is —COO—, —$CH_2CH_2$— or a single bond,

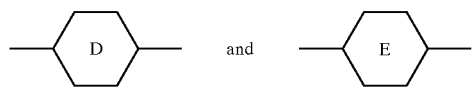

are each, independently of one another,

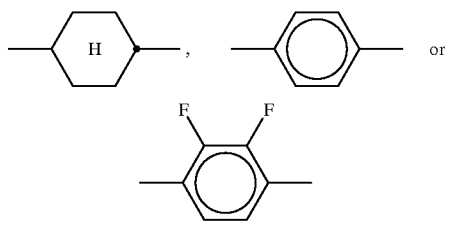

and
c is 0 or 1.

The invention also relates to corresponding liquid-crystal mixtures for use in TN and HTN displays.

Preferred compounds of the formula IA are, in particular, compounds of the sub-formulae IA-1 and IA-2

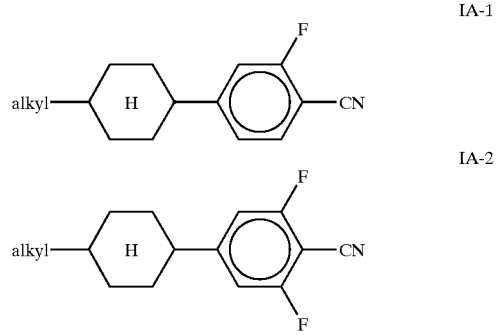

in which alkyl is straight-chain alkyl having 1 to 5 carbon atoms.

Preferred compounds of the formula IC are, in particular, compounds of the following sub-formulae:

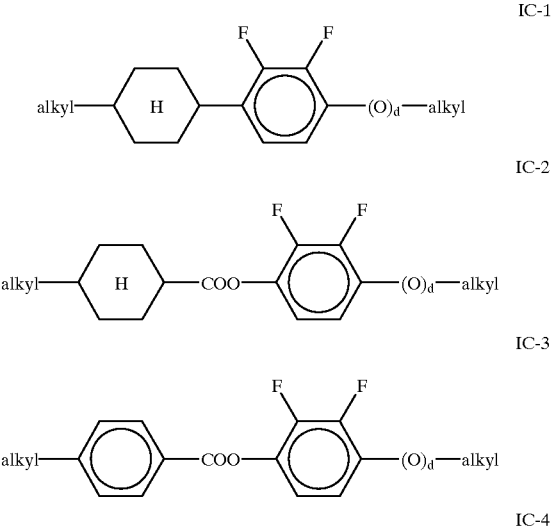

in which alkyl is straight-chain alkyl having 1 to 5 carbon atoms, and d is 0 or 1, in particular 1.

In a preferred embodiment, the liquid-crystal mixtures according to the invention additionally comprise one or more compounds of the formula IB

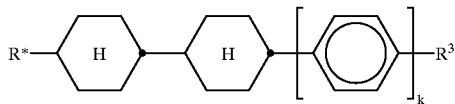

in which $R^3$ is as defined under the formula IC, k is 0 or 1, and $R^*$ is alkenyl having 2 to 12, preferably 2 to 8 carbon atoms.

In particular, the use of compounds of the formula IC results in TN and HTN displays having a high steepness the electro-optical characteristic line and good low-temperature stability.

Component A, besides the compounds of the formula IA, preferably comprises one or more compounds of the formulae II and III

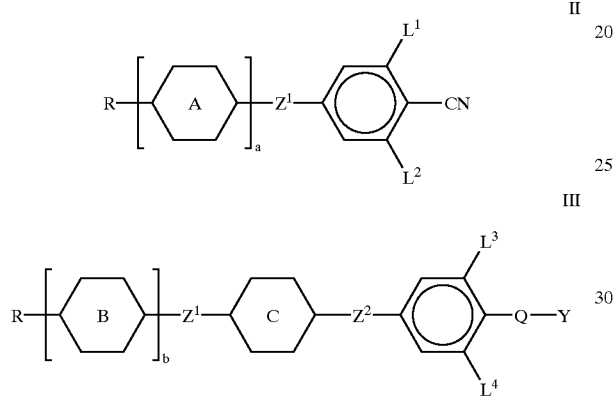

in which

R is as defined for $R^1$ under the formula IA,

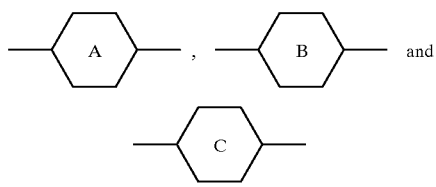

are each, independently of one another,

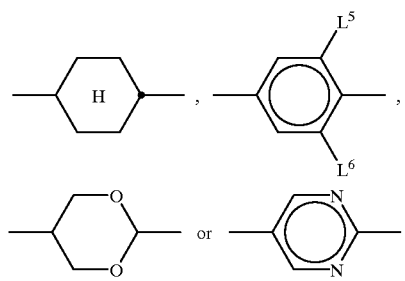

$L^1$ to $L^6$ are each, independently of one another, H or F
$Z^1$ is —COO—, —CH$_2$CH$_2$— or a single bond,
$Z^2$ is —CH$_2$CH$_2$—, —COO—, —C≡C— or a single bond,
Q is —CF$_2$—, —CHF—, OCF$_2$—, —OCHF— or a single bond,
Y is F or Cl,
a is 1 or 2, and
b is 0 or 1.

Preferred compounds of the formulae II and III conform to the following sub-formulae:

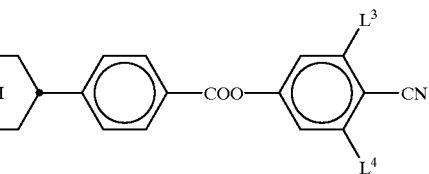

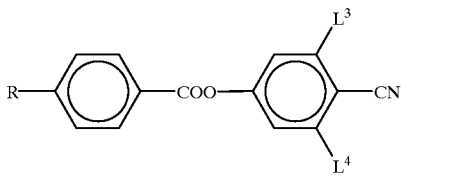

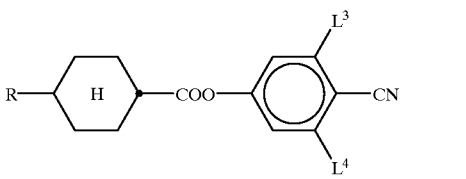

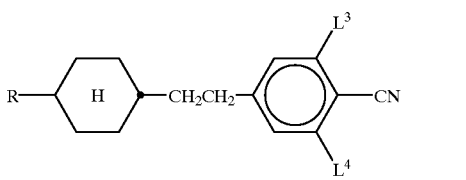

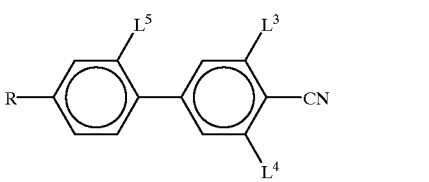

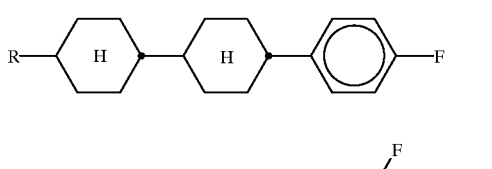

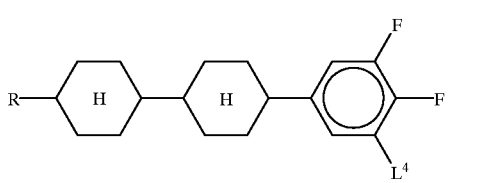

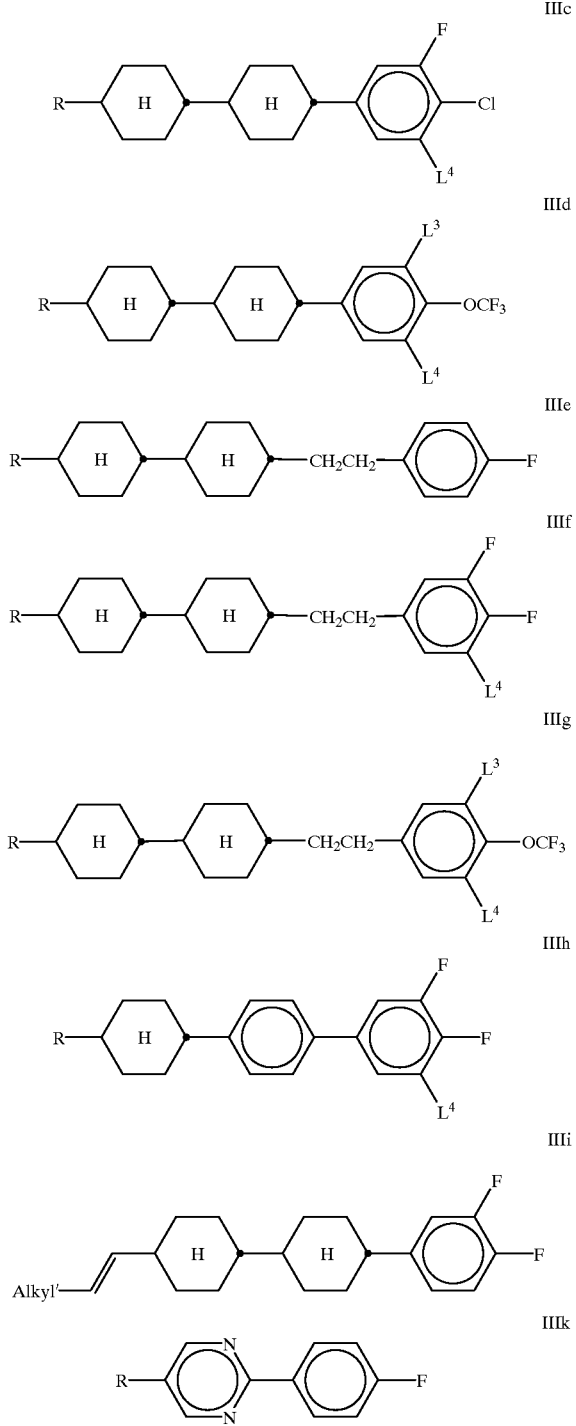

in which R, $L^3$, and $L^4$ are as defined above, and Alkyl' is H or straight-chain alkyl having 1 to 4 carbon atoms.

In addition to one or more compounds of the formulae IA and IC, preferred mixtures comprise two or more compounds of the formula IIa, IIb, IIc, IId, IIf, IIIb, IIId or IIIi, preferably one or more compounds of the formula IIa, IIb or IIc.

Preferred liquid-crystalline mixtures according to the invention comprise from 10% to 80%, in particular from 20% to 60%, of one or more compounds from Component A.

The compounds of Component A preferably have a dielectric anisotropy of greater than +3 (in particular greater than +8, particularly preferably greater than +12).

The mixtures according to the invention preferably comprise one or more compounds of the formula II in a proportion of from 10% to 45%. Preferred compounds are those in which $Z^1$ is a single bond, —$CH_2CH_2$— or —CO—O—. Particular preference is given to compounds of the formula IIa and the following compounds:

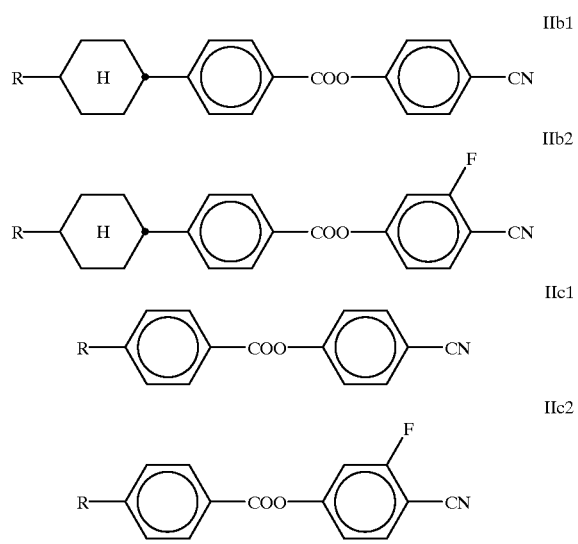

Component A preferably comprises one or more compounds selected from the formulae IIa, IIb1, IIb2, IIc1 and IIc2, in particular one to four compounds of the formulae IIa and IIc2.

Preferred liquid-crystalline mixtures according to the invention comprise one or more compounds from Component B, preferably from 15 to 70%. The compounds from Component B are substantially dielectrically neutral ($-1.5<\Delta\epsilon<1.5$) and preferably have low values for the rotational viscosity ($\gamma_1$) in particular values of $\gamma_1<150$ mPa·s.

Component B preferably comprises at least one compound. of the formula IB and one or more compounds selected from the group consisting of the bicyclic compounds of the formulae IV1 to IV9:

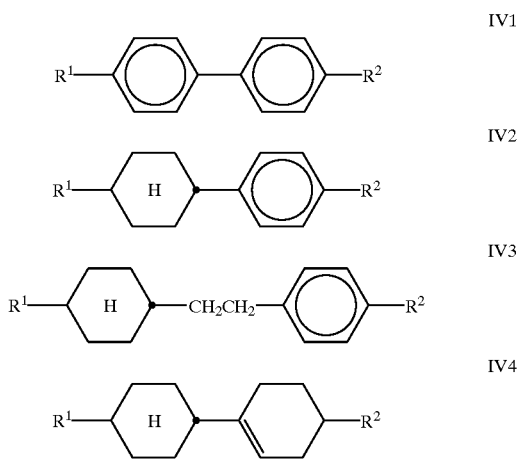

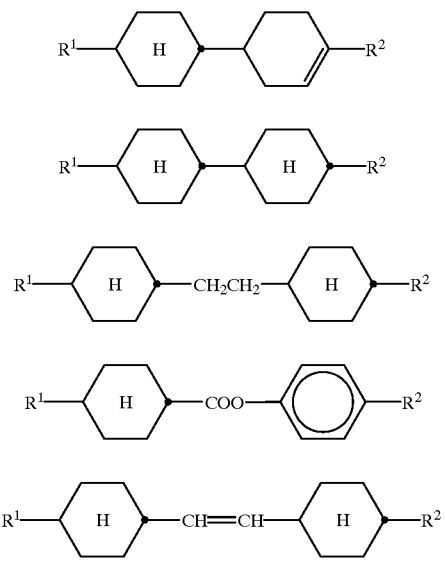

in which R¹ and R² are as defined for R.

Component B additionally preferably comprises one or more compounds selected from the group consisting of the trycyclic compounds of the formulae IV10 to IV26:

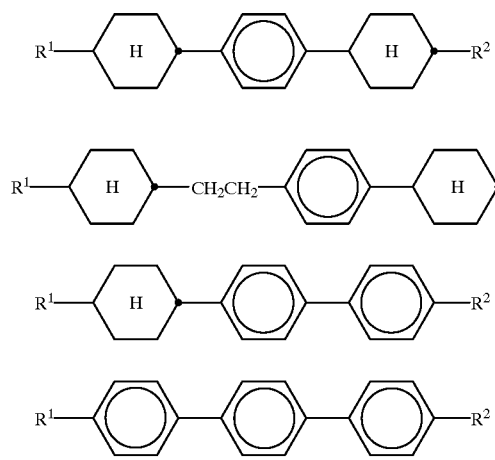

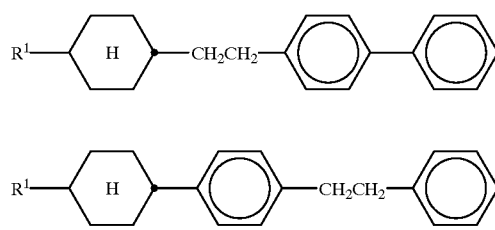

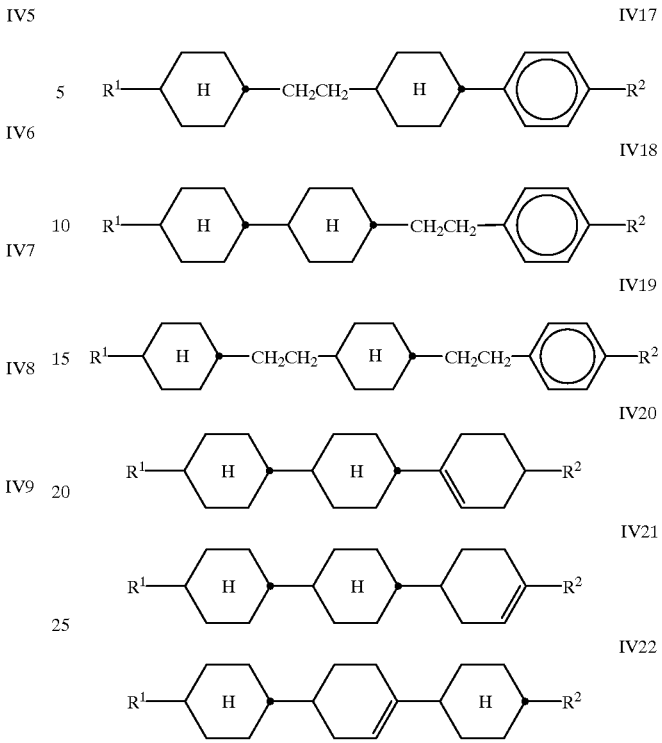

in which R¹ and R² are as defined above, and in which the 1,4-phenylene group in the formulae IV10 to IV19, IV23 and IV25 can in each case, independently of one another, be monosubstituted or polysubstituted by fluorine.

If desired, Component B additionally comprises one or more compounds selected from the group consisting of the tetracyclic compounds of the formulae IV27 to IV33:

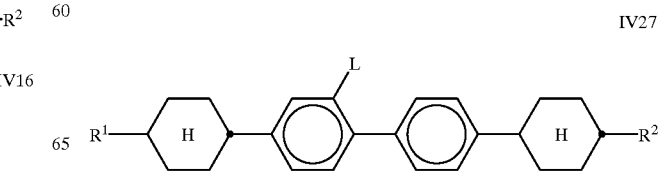

-continued

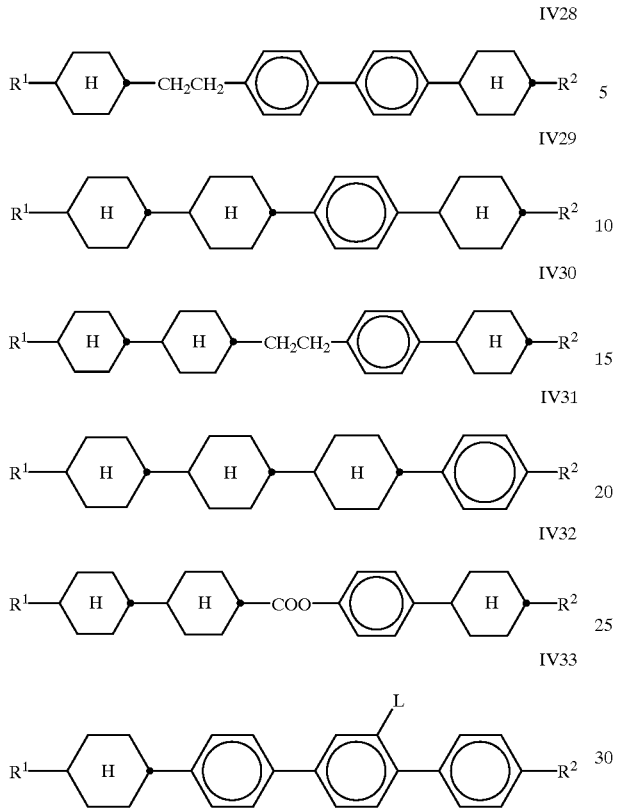

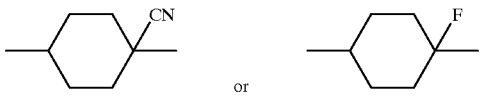

in which $R^1$ and $R^2$ are as defined for R, and L is F or H. The 1,4-phenylene groups in compounds IV25 to IV33 can in each case, independently of one another, also be monosubstituted or polysubstituted by fluorine.

Of the compounds of the formulae IV27 to IV33, preference is given to those which have a high clearing point, particularly preferably a clearing point of above 120° C.

The mixtures according to the invention particularly preferably each comprise one or more compounds selected from the formulae IV6, IV26, IV27 and IV29, where the proportion of each of these compounds is in each case up to 30%, in particular from 5 to 20%, based on the mixture as a whole.

$R^1$ and $R^2$ in the compounds of the formulae IV1 to IV33 are particularly preferably straight-chain alkyl or alkoxy having 1 to 12 carbon atoms. Preference is furthermore given to compounds of the formulae IV27 and IV33 in which L is F.

The proportion of compounds of Component C comprising one or more compounds having a dielectric anisotropy of <−1.5 is preferably 2%–50%, particularly 2–30 wt %, very preferably 5%–20%.

In a particularly preferred embodiment of the invention, the mixtures comprise, in addition to compounds of the formula IC, from 0% to 10% of one or more compounds from Component C having a dielectric anisotropy of less than −2, preferably one or more compounds containing the structural unit 2,3-difluoro-1,4-phenylene, for example compounds as described in DE-A 38 07 801, 38 07 861, 38 07 863, 38 07 864 or 38 07 908.

Other known compounds from Component C are, for example, derivatives of 2,3-dicyanohydroquinone or cyclohexane derivatives containing the structural unit as described in DE-A 32 31 707 or DE-A 34 07 013.

Particular preference is given to compounds from Component C which have a high value for the component of the dielectric constant perpendicular to the longitudinal molecular axis ($\epsilon_\perp$).

The mixtures according to the invention comprise, if desired, an optically active Component D in such an amount that the ratio between the layer thickness (separation of the outer plates) and the natural pitch of the liquid-crystal mixture is greater than 0.2. For example, the amount of Component D is 0–15 wt % of the total mixture. For Component D, a multiplicity of dopants, some of which are commercially available, are available to the person skilled in the art, such as, for example, cholesteryl nonanoate, S 811 or R 1011 (Merck KGaA, Darmstadt) and CB 15 (Merck Ltd., Poole, UK). The choice of dopants is not crucial per se.

The term "alkenyl", in the definition of R, $R^1$, $R^2$, $R^3$ and R* covers straight-chain and branched alkenyl groups having 2–12 carbon atoms, preferably 2–7 carbon atoms, in particular the straight-chain groups. Particularly preferred alkenyl groups are $C_2$–$C_7$-1E-alkenyl, $C_4$–$C_7$-3E-alkenyl, $C_5$–$C_7$-4-alkenyl, $C_6$–$C_7$-5-alkenyl and $C_7$-6-alkenyl, in particular $C_2$–$C_7$-1E-alkenyl, $C_4$–$C_7$-3E-alkenyl and $C_5$–$C_7$-4-alkenyl.

Examples of preferred alkenyl groups are vinyl, 1E-propenyl, 1E-butenyl, 1E-pentenyl, 1E-hexenyl, 1E-heptenyl, 3-butenyl, 3E-pentenyl, 3E-hexenyl, 3E-heptenyl, 4-pentenyl, 4Z-hexenyl, 4E-hexenyl, 4Z-heptenyl, 5-hexenyl, 6-heptenyl and the like. Groups having up to 5 carbon atoms are generally preferred. Particular preference is given to vinyl, 1E-propenyl, 1E-butenyl, 3E-butenyl and 3E-pentenyl, in particular vinyl and 3E-butenyl.

In further preferred embodiments, the mixtures according to the invention comprise one or more, preferably one or two, compounds selected from the formulae IA-1 and IA-2, in particular of the formula IA-2, in a proportion of from 5 to 30%, at least one compound of the formula IA and at least one compound of the formula IC in a total proportion of from 10 to 40%, preferably from 15 to 35%, one or more, preferably one or two, compounds selected from the formulae IC-1 and IC-2, in particular of the formula IC-2, in a proportion of from 5 to 45%, preferably from 1C to 25%, a compound of the formula IC-2 and a compound of the formula IA-2, each in a proportion of from 5 to 20%, one or more compounds of the formulae IB-1

IB-1 in a proportion of from 2 to 10%, one or more, preferably two or three, compounds of the formula IB-2

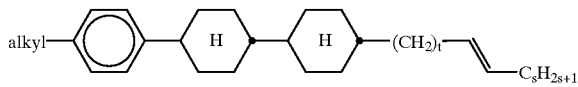

in a proportion of from 2 to 20%, and/or
one or more, preferably one, two or three, compounds of the formula V

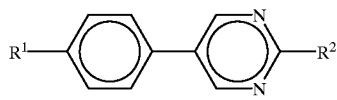

in a proportion of up to 20%, preferably from 2 to 20%, in which $R^1$ and $R^2$ are as defined above, and alkyl is straight-chain alkyl having 1 to 5 carbon atoms, t is 0, 1 or 2, preferably 2, and s is 0, 1 or 2, preferably 0.

A further particularly preferred embodiment of the invention relates to an HTN display containing a liquid-crystal mixture according to the invention as described above and below.

The individual compounds of the formulae IA, IB, IC, II, III and IV and further compounds which can be used in the liquid-crystal displays according to the invention are either known or can be prepared analogously to the known compounds by processes known per se, such as those described in Houben-Weyl, Methoden der organischen Chemie, Thieme-Verlag, Stuttgart, Germany.

The compounds of the formulae IA, LB, IC, II and III have particularly low values for the ratio between the elastic constants ($K_{33}/K_{11}$) and thus result in good steepness of the electro-optical characteristic line.

The mixtures according to the invention preferably have a birefringence Δn from 0.05 to 0.2 in particular from 0.07 to 0.12.

The optical retardation d·Δn of the TN and HTN displays according to the invention is preferably from 0.4 to 1.0, in particular from 0.5 to 0.8.

The liquid-crystal mixtures used in the TN and HTN cells according to the invention are dielectrically positive, with $\Delta\epsilon \geq 1$. Particular preference is given to liquid-crystal mixtures having $\Delta\epsilon \geq 3$, in particular those having $\Delta\epsilon \geq 5$.

The liquid-crystal mixtures according to the invention are furthermore characterized by advantageous values for the steepness of the electro-optical characteristic line, and can be operated with high multiplex rates, in particular at temperatures above 20° C. In addition, the liquid-crystal mixtures according to the invention have high stability and favourable values or the electrical resistance and the frequency dependence of the threshold voltage. The liquid-crystal displays according to the invention have a large working-temperature range and good angle dependence of the contrast.

The construction of the liquid-crystal display elements according to the invention from polarizers, electrode base plates and electrodes having a surface treatment such that the preferential alignment (director) of the liquid-crystal molecules in each case adjacent thereto is usually rotated from one electrode to the other by a value of from 22.5° to 160°, conforms to the usual construction for display elements of this type. The term "usual construction" is broadly drawn here and also covers all derivatives and modifications of the TN and HTN cell, in particular including matrix display elements and display elements containing additional magnets.

The surface tilt angle at the two outer plates may be identical or different. Identical tilt angles are preferred. Preferred TN and HTN displays have tilt angles between the longitudinal axis of the molecules at the surface of the outer plates and the outer plates of from 0° to 7°, preferably from 0.01° to 5°, in particular from 0.1 to 2°.

The twist angle of the mixture in a TN display according to the invention has a value of between 22.5° and 100°, preferably between 45° and 100° in particular between 75° and 95°. In an HTN display according to the invention, the twist angle of the mixture from alignment layer to alignment layer has a value of between 100° and 160°, preferably between 100° and 130°, in particular between 105° and 115°.

The liquid-crystal mixtures which can be used in accordance with the invention are prepared in a manner which is conventional per se. In general, the desired amount of the components used in lesser amount are dissolved in the components making up the principal constituent, advantageously at elevated temperature. It is also possible to mix solutions of the components in an organic solvent, for example in acetone, chloroform or methanol, and to remove the solvent again after mixing, for example by distillation.

The dielectrics can also comprise further additives known to the person skilled in the art and described in the literature. For example, 0–15% of pleochroic dyes can be added.

The examples below are intended to illustrate the invention without representing a limitation. The following abbreviations are used:

| | |
|---|---|
| visc. | rotational viscosity (mPa · s) |
| Δn | optical anisotropy (589 nm, 20° C.) |
| Δε | dielectric anisotropy (20° C.) |
| d · Δn | optical retardation |
| $t_{on}$ | time from switching on until 90% of the maximum contrast is reached |
| $t_{off}$ | time from switching off until 10% of the maximum contrast is reached |
| $V_{90}/V_{10}$ | steepness |
| $V_{10}$ | threshold voltage |
| $t_{ave}$ | $(t_{on} + t_{off})/2$ (average response time) |

Above and below, all temperatures are given in ° C. The percentages are per cent by weight. The values for the response times and viscosities are based on 20° C., unless stated otherwise. The response time is, unless stated otherwise, the average value $t_{ave}$ of the switch-on and switch-off times.

In the present application and in the examples below, the structures of the liquid-crystal compounds are indicated by means of acronyms, the transformation into chemical formulae taking place in accordance with Tables A and B below. All radicals $C_nH_{2n+1}$ and $C_mH_{2m+1}$ are straight-chain alkyl radicals having n and m carbon atoms respectively. The alkenyl radicals have the trans-configuration. The coding in Table B is self-evident. In Table A, only the acronym for the parent structure is given. In individual cases, this is followed, separated from the acronym for the parent structure by a dash, by a code for the substituents $R^1$, $R^2$, $L^1$, $L^2$ and $L^3$:

| Code for R$^1$, R$^1$ R$^2$, L$^1$, L$^2$, L$^3$ | R$^2$ | L$^1$ | L$^2$ | L$^3$ |
|---|---|---|---|---|
| nm | C$_m$H$_{2m+1}$ | H | H | H |
| nOm | OC$_n$H$_{2n+1}$ C$_m$H$_{2mn}$l | H | H | H |
| nO.m | OC$_m$H$_{2m+1}$ | H | H | H |
| n | CN | H | H | H |
| nN.F | CN | H | H | F |
| nN.F.F | CN | H | F | F |
| nF | F | H | H | H |
| nOF | F | H | H | H |
| nCl | Cl | H | H | H |
| nF.F | F | H | H | F |
| nmF | C$_m$H$_{2m+1}$ | F | H | H |
| nCF$_3$ | CF$_3$ | H | H | H |
| nOCF$_3$ | OCF$_3$ | H | H | H |
| n-Vm | —CH=CH—C$_m$H$_{2m+1}$ | H | H | H |
| nV-Vm | —CH=CH—C$_m$H$_{2m+1}$ | H | H | H |

(For nm: R$^1$ = C$_n$H$_{2n+1}$; nOm: OC$_n$H$_{2n+1}$; etc. per code.)

The TN and HTN displays preferably contain liquid-crystalline mixtures composed of one or more compounds from Tables A and B.

TABLE A (L$^1$, L$^2$, L$^3$ = H or F)

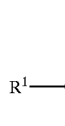

BCH

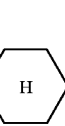

CBC

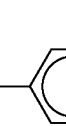

CCH

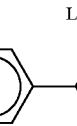

CCP

CP

TABLE A-continued (L$^1$, L$^2$, L$^3$ = H or F)

ME

HP

PCH

CCPC

CH

D

TABLE B

PYP-nm

D-n0mFF

TABLE B-continued

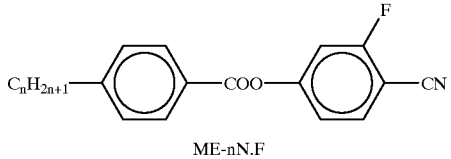

ME-nN.F

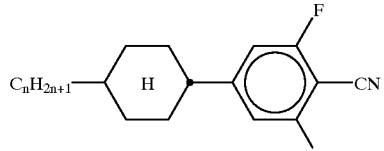

PCH-nN.F.F

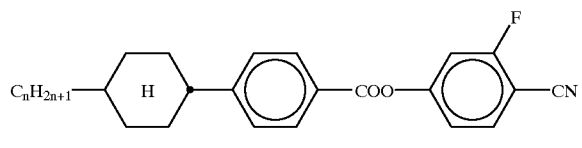

HP-nN.F

EXAMPLE 1

The following mixture is prepared:

| | | | |
|---|---|---|---|
| ME2N.F | 5.00% | Clearing point: | 55.5° C. |
| ME3N.F | 6.00% | $\Delta n$: | 0.0963 |
| ME4N.F | 11.00% | $\Delta\epsilon$: | +20.6 |
| ME5N.F | 11.00% | | |
| PCH-3N.F.F | 15.00% | | |
| CCH-3O3 | 10.00% | | |
| CCH-5O1 | 9.00% | | |
| CH-33 | 3.00% | | |
| CH-35 | 3.00% | | |
| CH-43 | 3.00% | | |
| CH-45 | 3.00% | | |
| CCPC-33 | 4.00% | | |
| CCPC-34 | 4.00% | | |
| CCPC-35 | 3.00% | | |
| D-3O2FF | 10.00% | | |

TN and HTN displays containing this mixture have the following properties:

| TN | | HTN | | HTN | |
|---|---|---|---|---|---|
| Twist: | 90° | Twist: | 110° | Twist: | 110° |
| $d \cdot \Delta n$ | 0.50 | $d \cdot \Delta n$ | 0.50 | $d \cdot \Delta n$ | 0.73 |
| $V_{10}$ | 0.69 V | $V_{10}$ | 0.71 V | $V_{10}$ | 0.83 V |
| $V_{90}/V_{10}$ | 1.533 | $V_{90}/V_{10}$ | 1.430 | $V_{90}/V_{10}$ | 1.347 |

EXAMPLE 2

The following mixture is prepared:

| | | | |
|---|---|---|---|
| ME2N.F | 6.00% | Clearing point: | 67.0° C. |
| ME3N.F | 6.00% | $\Delta n$: | 0.1005 |
| ME4N.F | 8.00% | $\Delta\epsilon$: | +17.6 |
| ME5N.F | 5.00% | | |
| PCH-3N.F.F | 15.00% | | |
| CCH-3O3 | 8.00% | | |
| CCH-5O1 | 7.00% | | |
| CH-33 | 4.00% | | |
| CH-35 | 4.00% | | |
| CH-43 | 4.00% | | |
| CH-45 | 3.00% | | |
| CCPC-33 | 5.00% | | |
| CCPC-34 | 5.00% | | |
| CCPC-35 | 4.00% | | |
| D-3O2FF | 10.00% | | |
| PYP-32 | 6.00% | | |

TN and HTN displays containing this mixture have the following properties:

| TN | | HTN | | HTN | |
|---|---|---|---|---|---|
| Twist: | 90° | Twist: | 110° | Twist: | 110° |
| $d \cdot \Delta n$ | 0.50 | $d \cdot \Delta n$ | 0.50 | $d \cdot \Delta n$ | 0.73 |
| $V_{10}$ | 0.91 V | $V_{10}$ | 0.85 V | $V_{10}$ | 1.00 V |
| $V_{90}/V_{10}$ | 1.527 | $V_{90}/V_{10}$ | 1.438 | $V_{90}/V_{10}$ | 1.327 |

COMPARATIVE EXAMPLE

The following mixture is prepared:

| | | | |
|---|---|---|---|
| ME2N.F | 5.00% | Clearing point: | 67.0° C. |
| ME3N.F | 6.00% | $\Delta n$: | 0.1004 |
| ME4N.F | 11.00% | $\Delta\epsilon$: | +21.1 |
| ME5N.F | 11.00% | | |
| HP-3N.F | 4.00% | | |
| HP-4N.F | 4.00% | | |
| HP-5N.F | 4.00% | | |
| CCH-3O1 | 6.00% | | |
| CCH-3O3 | 11.00% | | |
| CCH-5O1 | 11.00% | | |
| CCH-5O2 | 11.00% | | |
| CH-33 | 3.00% | | |
| CH-35 | 3.00% | | |
| CH-43 | 3.00% | | |
| CH-45 | 3.00% | | |
| CP-33F | 4.00% | | |

TN and HTN displays containing This mixture have the following properties:

| TN | | HTN | | HTN | |
|---|---|---|---|---|---|
| Twist: | 90° | Twist: | 110° | Twist: | 110° |
| $d \cdot \Delta n$ | 0.50 | $d \cdot \Delta n$ | 0.50 | $d \cdot \Delta n$ | 0.73 |
| $V_{10}$ | 0.87 V | $V_{10}$ | 0.82 V | $V_{10}$ | 0.96 V |
| $V_{90}/V_{10}$ | 1.551 | $V_{90}/V_{10}$ | 1.476 | $V_{90}/V_{10}$ | 1.352 |

The preceding examples can be repeated with similar success by substituting the generically or specifically described reactants and/or operating conditions of this invention for those used in the preceding examples.

Without further elaboration, it is believed that one skilled in the art can, using the preceding description, utilize the present invention to its fullest extent. The above specific embodiments are, therefore, to be construed as merely illustrative, and not limitative of the remainder of the disclosure in any way whatsoever.

From the foregoing description, one skilled in the art can easily ascertain the essential characteristics of this invention and, without departure from the spirit and scope thereof, can make various changes and modifications of the invention to adapt it to various usages and conditions.

The entire disclosure of all applications, patents and publications, cited above, and of corresponding German application No. DE 198 55 071.5, filed Nov. 28, 1998 is hereby incorporated by reference.

What is claimed:

1. A liquid crystal display comprising:

two outer plates which, with a frame, form a cell, a nematic liquid-crystal mixture of positive dielectric anisotropy in the cell, electrode layers with alignment layers on the insides of the outer plates, a tilt angle between the longitudinal axis of the molecules at the surface of the outer plates and the outer plates of 0–15 degrees, and a twist angle of the liquid-crystal mixture in the cell from alignment layer to alignment layer with a value of 22.5°–160°, wherein said nematic liquid-crystal mixture comprises a) 15–80% by weight of a liquid crystalline Component A of one or more compounds having a dielectric anisotropy of greater than +1.5;

b) 15–70% by weight of a liquid crystalline Component B of one or more compounds having a dielectric anisotropy of between −1.5 and +1.5;

c) 2–50% by weight of a liquid-crystalline Component C of one or more compounds having a dielectric anisotropy of below −1.5, and d) optionally, an optically active Component D in an amount whereby the ratio of the layer thickness (separation of the outer plates) to the natural pitch of the nematic liquid-crystal mixture is 0.2–1.3, wherein Component A comprises at least one compound of the formula IA and at least one compound of formula IIc

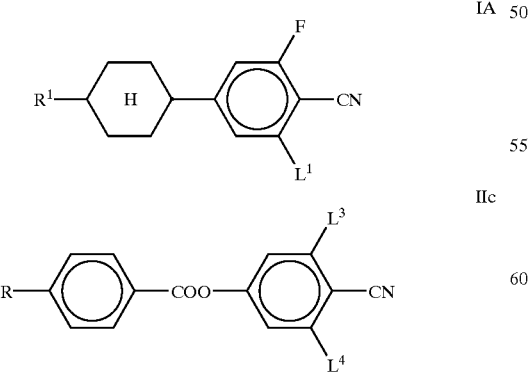

and Component C comprises at least one compound of the formula IC

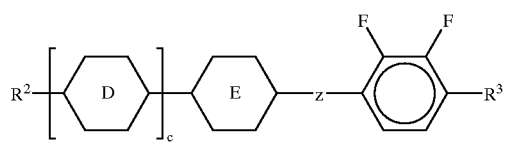

in which $R^1$, $R^2$, $R^3$ and R are each, independently of one another, an alkyl group having 1 to 12 carbon atoms, in which, in addition, one or two nonadjacent $CH_2$ groups can in each case be replaced by —O—, —CH=CH—, —CO—, —OCO— or —COO—, $L^1$ is H or F, $L^3$ and $L^4$ are both F, Z is —COO—, —$CH_2CH_2$— or a single bond,

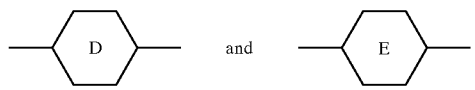

are each, independently of one

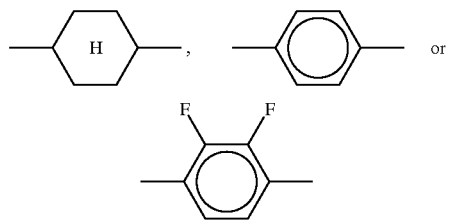

and c is 0 or 1, wherein said mixture contains 5–30 wt % of one or more compounds of formula IA, 10–45 wt % of one or more compounds of formula IIc, and 5–45 wt % of one or more compounds of formula IC.

2. A liquid-crystal display according to claim 1, wherein Component A comprises one or more compounds of formulae IA-1 and IA-2:

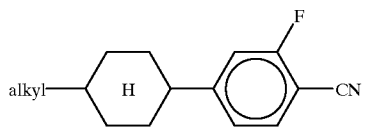

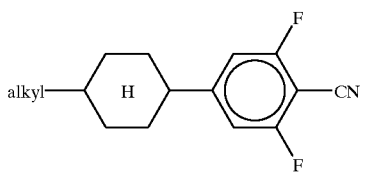

in which alkyl is straight-chain alkyl having 1 to 5 carbon atoms.

3. A liquid-crystal display according to claim 1, wherein Component C comprises one or more compounds of formulae IC-1 to IC-5:

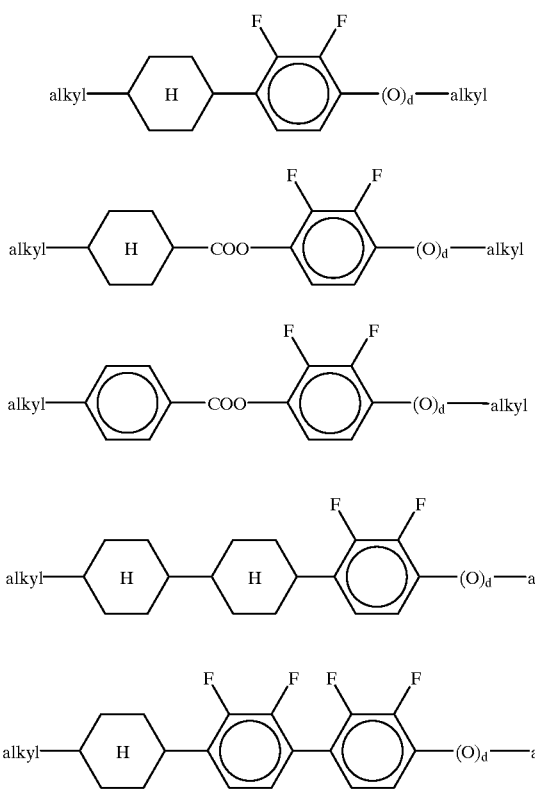

in which alkyl is straight-chain alkyl having 1–5 carbon atoms and d is 0 or 1.

4. A liquid-crystal display according to claim 2, wherein Component C comprises one or more compounds of formulae IC-1 to IC-5:

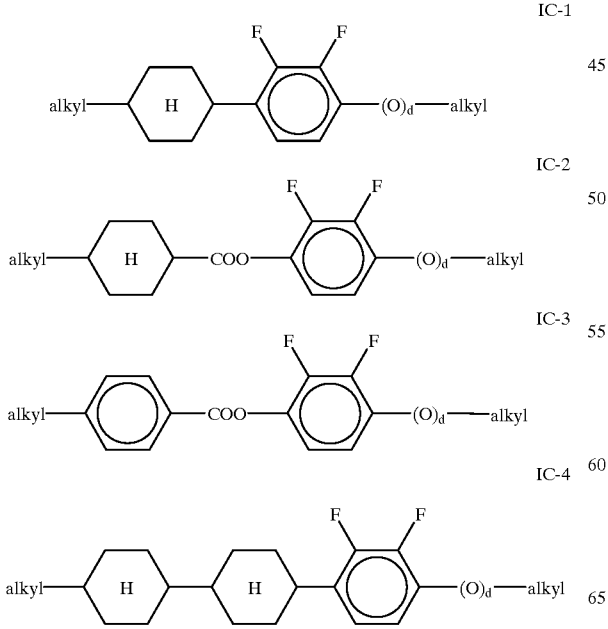

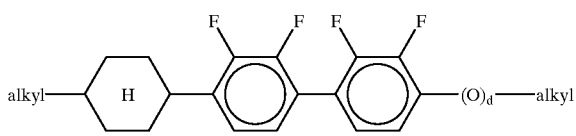

in which alkyl is straight-chain alkyl having 1–5 carbon atoms and d is 0 or 1.

5. A liquid-crystal display according to claim 1, wherein Component A further comprises one or more compounds of formula II which are different from the compounds of the general formula IA and formula III:

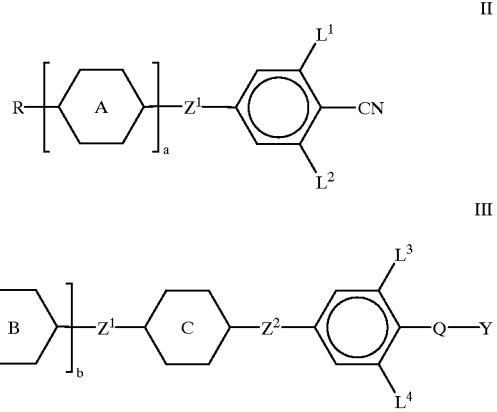

in which

R is an alkyl group having 1 to 12 carbon atoms, in which, in addition, one or two nonadjacent $CH_2$ groups can in each case be replaced by —O—, —CH=CH—, —CO—, —OCO— or —COO—,

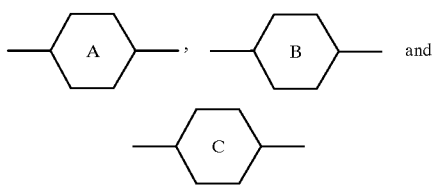

are each, independently of one another,

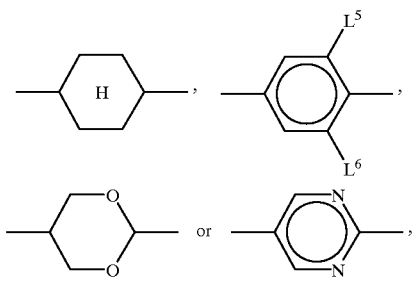

$L^1$ to $L^6$ are each, independently of one another, H or F,
$Z^1$ is —COO—, —$CH_2CH_2$— or a single bond,
$Z^2$ is —$CH_2CH_2$—, —COO—, —C≡C— or a single bond, Q is —CF$_2$—, —CHF—, OCF$_2$—, —OCHF— or a single bond, Y is F or Cl, a is 1 or 2 and b is 0 or 1.

6. A liquid-crystal display according to claim 2, wherein Component A further comprises one or more compounds of formula II which are different from the compounds of the general formula IA and IIc and formula III:

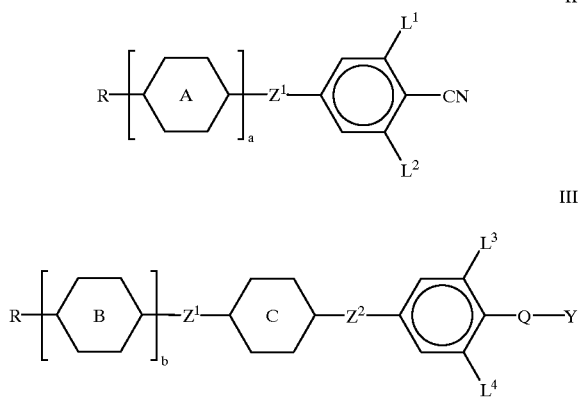

in which

R is an alkyl group having 1 to 12 carbon atoms, in which, in addition, one or two nonadjacent CH$_2$ groups can in each case be replaced by —O—, —CH=CH—, —CO—, —OCO— or —COO—,

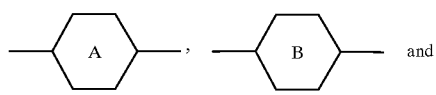

are each, independently of one another,

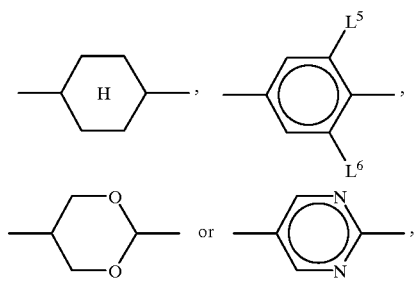

L$^1$ to L$^6$ are each, independently of one another, H or F,

Z$^1$ is —COO—, —CH$_2$CH$_2$— or a single bond,

Z$^2$ is —CH$_2$CH$_2$—, —COO—, —C≡C— or a single bond,

Q is —CF$_2$—, —CHF—, OCF$_2$—, —OCHF— or a single bond,

Y is F or Cl, a is 1 or 2 and b is 0 or 1.

7. A liquid-crystal display according to claim 3, wherein Component A further comprises one or more compounds of formula II which are different from the compounds of the general formula IA and formula III:

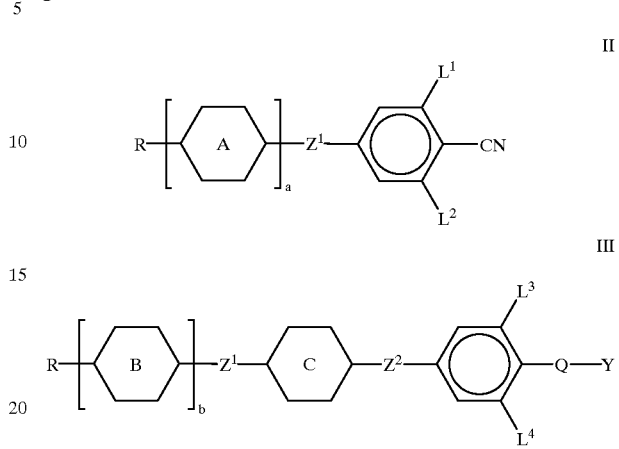

in which

R is an alkyl group having 1 to 12 carbon atoms, in which, in addition, one or two nonadjacent CH$_2$ groups can in each case be replaced by —O—, —CH=CH—, —CO—, —OCO— or —COO—,

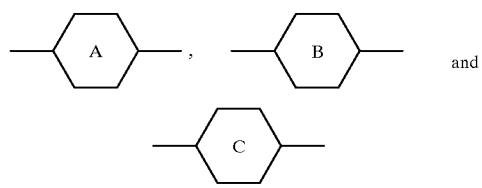

are each, independently of one another,

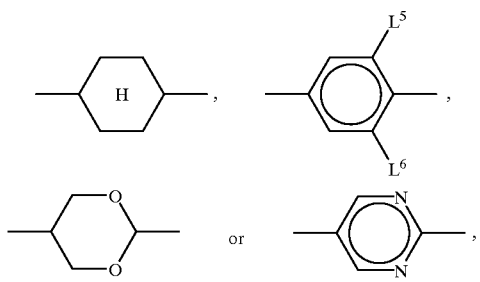

L$^1$ to L$^6$ are each, independently of one another, H or F,

Z$^1$ is —COO—, —CH$_2$CH$_2$— or a single bond,

Z$^2$ is —CH$_2$CH$_2$—, —COO—, —C≡C— or a single bond,

Q is —CF$_2$—, —CHF—, OCF$_2$—, —OCHF— or a single bond,

Y is F or Cl, a is 1 or 2 and b is 0 or 1.

8. A liquid-crystal display according to claim 1, wherein Component A comprises at least one compound of the following formulae:

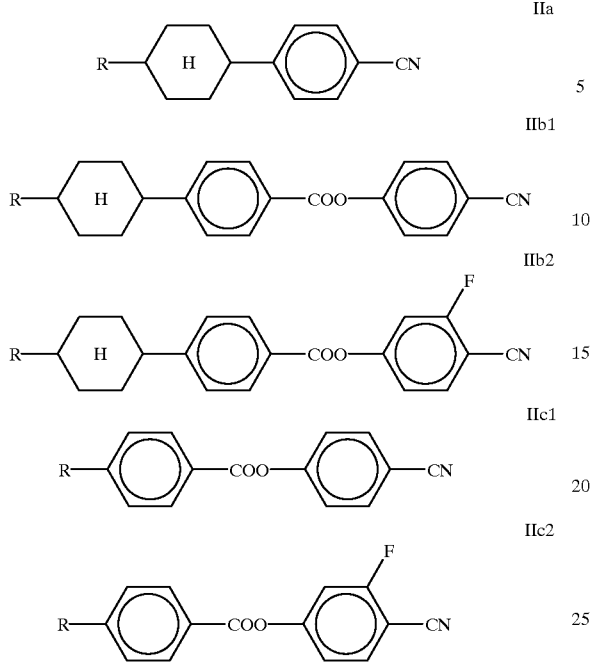

in which R is an alkyl group having 1 to 12 carbon atoms, in which, in addition, one or two nonadjacent CH$_2$ groups can in each case be replaced by —O—, —CH=CH—, —CO—, —OCO— or —COO—.

9. A liquid-crystal display according to claim 1, wherein Component B comprises one or more compounds of formulae IB:

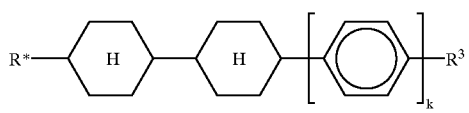

in which

R$^3$ is an alkyl group having 1 to 12 carbon atoms, in which, in addition, one or two nonadjacent CH$_2$ groups can in each case be replaced by —O—, —CH=CH—, —CO—, —OCO— or —COO—, k is 0 or 1, and R* is alkenyl having 2 to 8 carbon atoms.

10. A liquid-crystal display according to claim 1, wherein Component B comprises one or more compounds of the formulae IV1 to IV9:

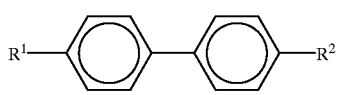

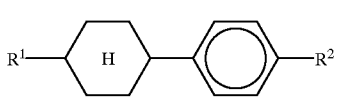

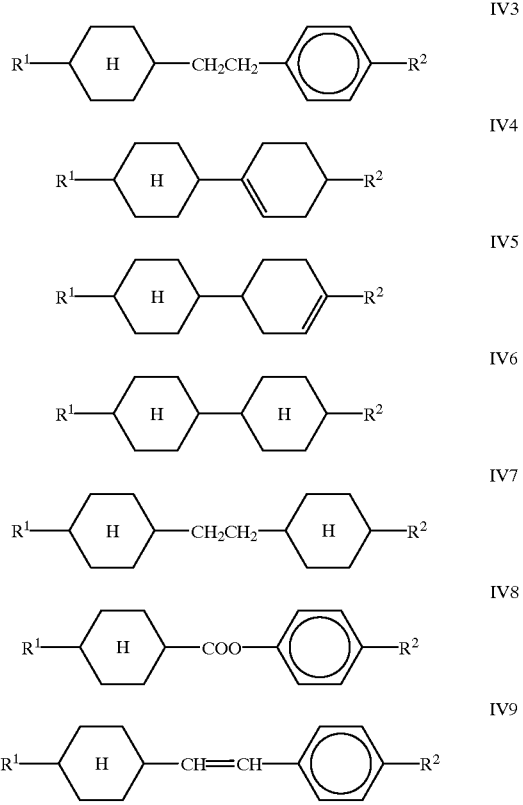

in which

R$^1$ and R$^2$ are each, independently of one another, an alkyl group having 1 to 12 carbon atoms, in which, in addition, one or two nonadjacent CH$_2$ groups can in each case be replaced by —O—, —CH=CH—, —CO—, —OCO— or —COO—.

11. A liquid-crystal display according to claim 1, wherein Component B comprises one or more compounds of the formulae IV10 to IV26:

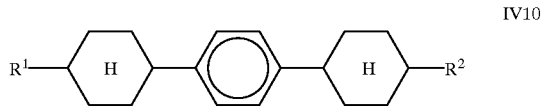

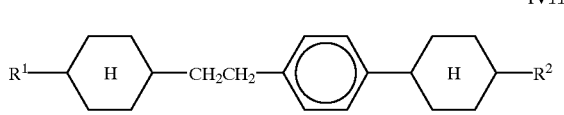

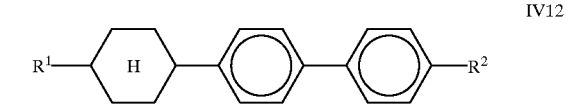

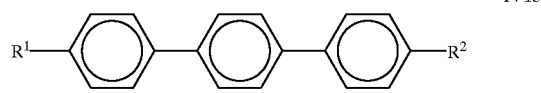

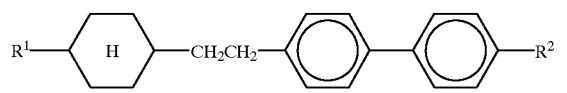

IV14

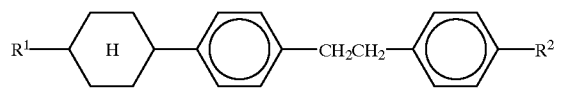

IV15

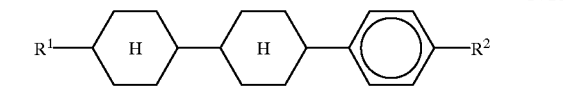

IV16

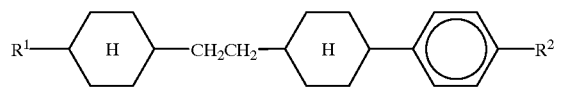

IV17

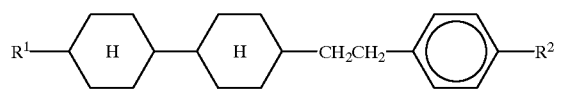

IV18

IV19

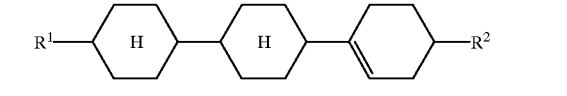

IV20

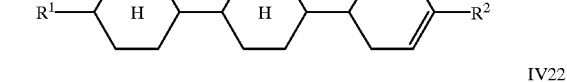

IV21

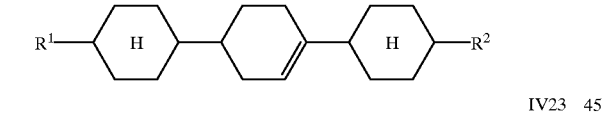

IV22

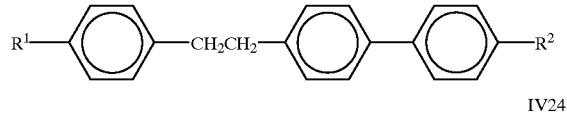

IV23

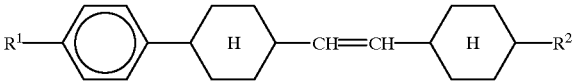

IV24

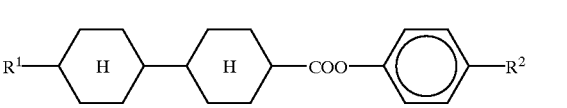

IV25

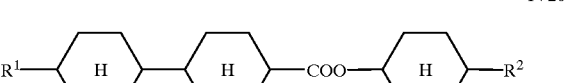

IV26 in which

R$^2$ and R$^2$ are each, independently of one another, an alkyl group having 1 to 12 carbon atoms, in which, in addition, one or two nonadjacent CH$_2$ groups can in each case be replaced by —O—, —CH=CH—, —CO—, —OCO— or —COO—, and the 1,4-phenylene groups in formulae IV10 to IV19, IV23 and IV25 can each, independently of one another, be monosubstituted or polysubstituted by fluorine.

12. A liquid crystal display according to claim 1, wherein Component B comprises one or more compounds of the formulae IV27 to IV33:

IV27

IV28

IV29

IV30

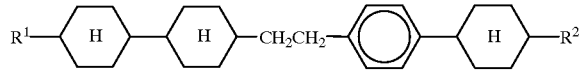

IV31

IV32

IV33

in which

R$^1$ and R$^2$ are each, independently of one another, an alkyl group having 1 to 12 carbon atoms, in which, in addition, one or two nonadjacent CH$_2$ groups can in each case be replaced by —O—, —CH=CH—, —CO—, —OCO— or —COO—, L is F or H, and the 1,4-phenylene groups in the compounds IV25 to IV33 can each, independently of one another, also be monosubstituted or polysubstituted by fluorine.

13. A liquid-crystal display according to claim 1, wherein the liquid-crystal mixture comprises at least one compound of the formula IA and at least one compound of the formula IC in a total proportion of from 10 to 40%.

14. A liquid-crystal display according to claim 1, wherein said display is a HTN display.

15. A liquid crystal display according to claim 1, wherein said liquid crystal mixture comprises 20–60% by weight of Component A, 15–70% by weight of Compound B, and 5–20% by weight of Component C.

16. A liquid crystal mixture comprising:

a) 15–80% by weight of a liquid crystalline Component A of one or more compounds having a dielectric anisotropy of greater than +1.5;

b) 15–70% by weight of a liquid crystalline Component B of one or more compounds having a dielectric anisotropy of between −1.5 and −1.5;

c) 2–50% by weight of a liquid-crystalline Component C of one or more compounds having a dielectric anisotropy of below −1.5, and d) optionally, an optically active Component D in an amount whereby the ratio of the layer thickness (separation of the outer plates) to the natural pitch of the nematic liquid-crystal mixture is 0.2–1.3, wherein Component A comprises at least one compound of the formula IA and at least one compound of formula IIc

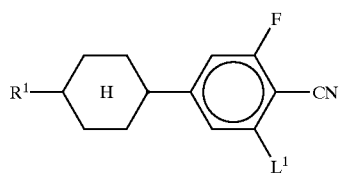

IA

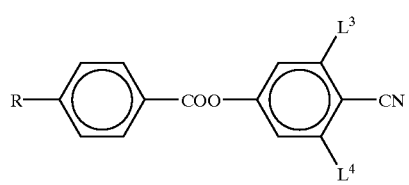

IIc and Component C comprises at least one compound of the formula IC

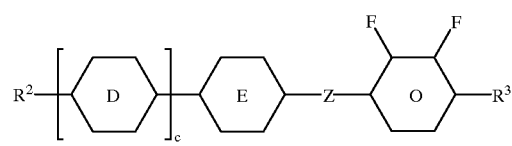

IC in which
R$^1$, R$^2$, R$^3$ and R are each, independently of one another, an alkyl group having 1 to 12 carbon atoms, in which, in addition, one or two nonadjacent CH$_2$ groups can in each case be replaced by —O—, —CH=CH—, —CO—, —OCO— or —COO—, L$^1$ is H or F,
L$^3$ and L$^4$ are both F,
Z is —COO—, —CH$_2$CH$_2$— or a single bond,

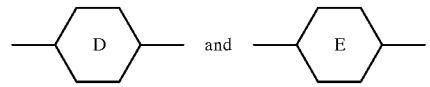

are each, independently of one another,

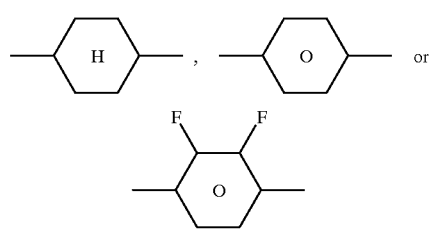

and
c is 0 or 1,
wherein said mixture contains 5–30 wt % of one or more compounds of formula Ia and 10–45 wt % of one or more compounds of formula IIc, and 5–45 wt % of one or more compounds of formula IC.

* * * * *

UNITED STATES PATENT AND TRADEMARK OFFICE
CERTIFICATE OF CORRECTION

PATENT NO. : 6,403,171 B1
DATED : June 11, 2002
INVENTOR(S) : Harald Hirschmann

It is certified that error appears in the above-identified patent and that said Letters Patent is hereby corrected as shown below:

Column 19,
Line 29, reads "of22.5°-160°," should read -- of 22.5°-160°, --.

Column 20,
Line 26, reads "independently of one" should read -- independently of one another --.

Column 28,
Line 2, reads "$R^2$ and $R^2$" should read -- $R^1$ and $R^2$ --.

Column 29,
Line 3, reads "Compound B," should read -- Component B, --.
Line 12, reads "between –1.5 and –1.5;" should read -- between –1.5 and +1.5; --.

Signed and Sealed this

Twentieth Day of September, 2005

JON W. DUDAS
*Director of the United States Patent and Trademark Office*